United States Patent [19]
Highland

[11] Patent Number: 6,145,120
[45] Date of Patent: Nov. 7, 2000

[54] DECLARATION PROGRAMMING LANGUAGE EXTENSION FOR PROCEDURAL PROGRAMMING LANGUAGES

[75] Inventor: Frederic D. Highland, New Midway, Md.

[73] Assignee: Lockheed Martin Corporation, Bethesda, Md.

[21] Appl. No.: 09/046,637

[22] Filed: Mar. 24, 1998

[51] Int. Cl.[7] .................................................. G06F 9/45
[52] U.S. Cl. ............................ 717/1; 717/2; 703/23; 706/47
[58] Field of Search ............................. 395/701–703, 395/705, 500.44, 500.47; 707/103; 706/45–48; 703/23, 26

[56] References Cited

U.S. PATENT DOCUMENTS

| | | | |
|---|---|---|---|
| 4,989,132 | 1/1991 | Mellender et al. ............... | 395/705 |
| 5,084,813 | 1/1992 | Ono . | |
| 5,202,993 | 4/1993 | Tarsey et al. . | |
| 5,303,332 | 4/1994 | Kirk et al. . | |
| 5,339,420 | 8/1994 | Hoxey . | |
| 5,448,740 | 9/1995 | Kiri et al. . | |
| 5,596,752 | 1/1997 | Knudsen et al. ............... | 395/701 |
| 5,644,770 | 7/1997 | Burke et al. ............... | 395/710 |

OTHER PUBLICATIONS

Tyugu, "From object–oriented to knowledge–based programming", !EEE, 1995, pp. 88–95.

Leonardi et al., Combining logic–and object–oriented programming language paradigms, IEEE 1995, pp.376–385.

Cacace et al., "Integrating object–oriented data modeling with a rule–based Programming paradigm", ACM, 1990, pp. 225–236.

Czejdo et al., "Permanent object storage and collections for object–oriented systems with rules", ACM, 1992, pp. 369–376.

Abiteboul et al., "Procedural and declarotive database update languages", ACM, 1988, pp. 240–250.

*Primary Examiner*—Kakali Chaki
*Attorney, Agent, or Firm*—McGuire, Woods, Battle & Boothe, LLP

[57] ABSTRACT

Complex declarative programming capabilities are provided through an underlying procedural programming code by functionally providing the selection algorithm of known declarative processing arrangements in explicit conditional constructs in procedural language embodying a rule or rule function statement. This approach simultaneously provides declarative processes easily and simply in a relatively few lines of procedural code while isolating the processing to the rules and objects, themselves, thereby providing reduction in hardware overhead requirements and performance enhancements which will be more fully discussed below. Further, by providing for updating of attributes and relationships of objects together with time tags associated with the update and removal of objects from list for evaluation, imprecise evaluation and heuristic reasoning may be readily developed while providing further performance enhancements to known Lazy Evaluation procedures.

22 Claims, 15 Drawing Sheets

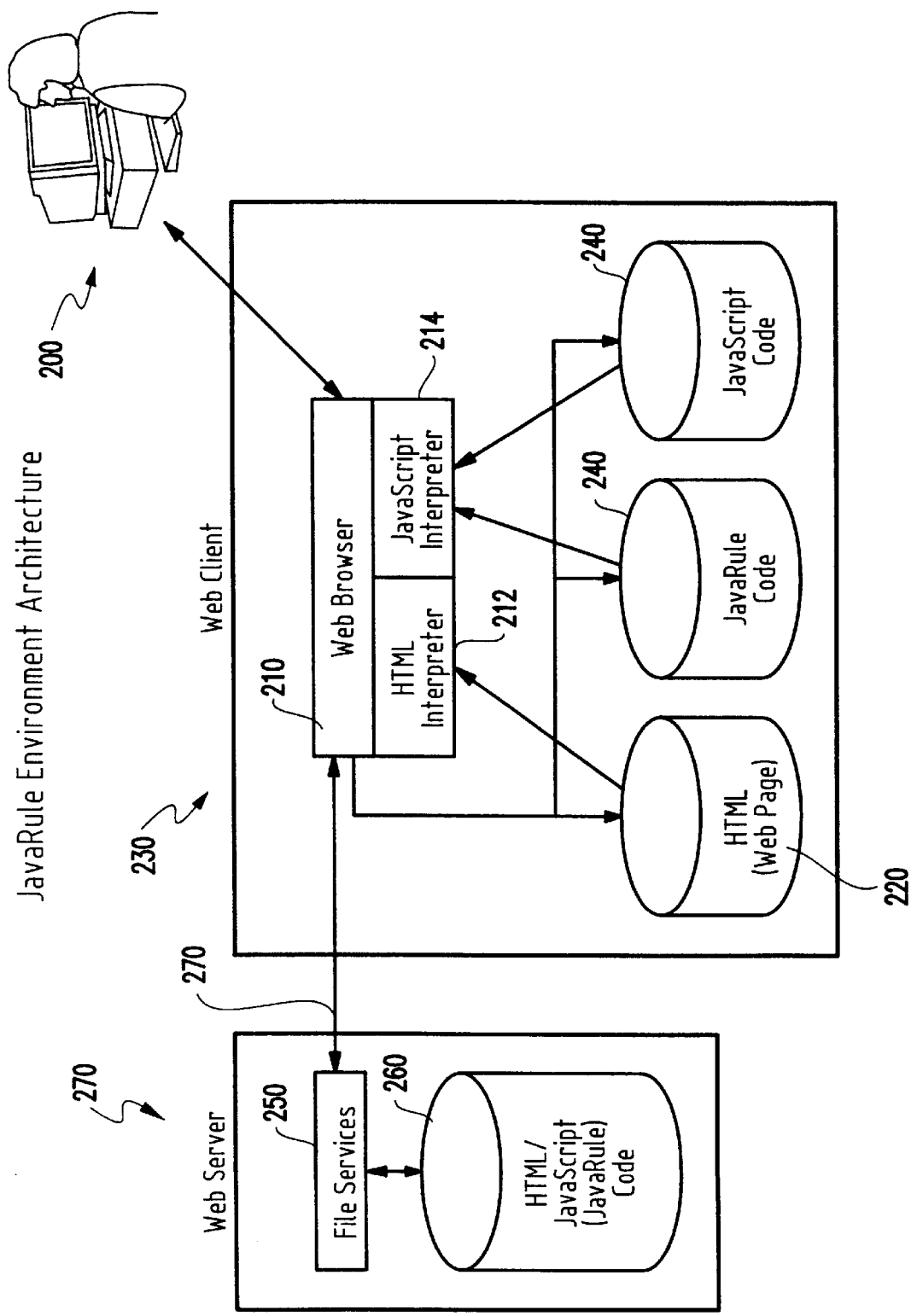

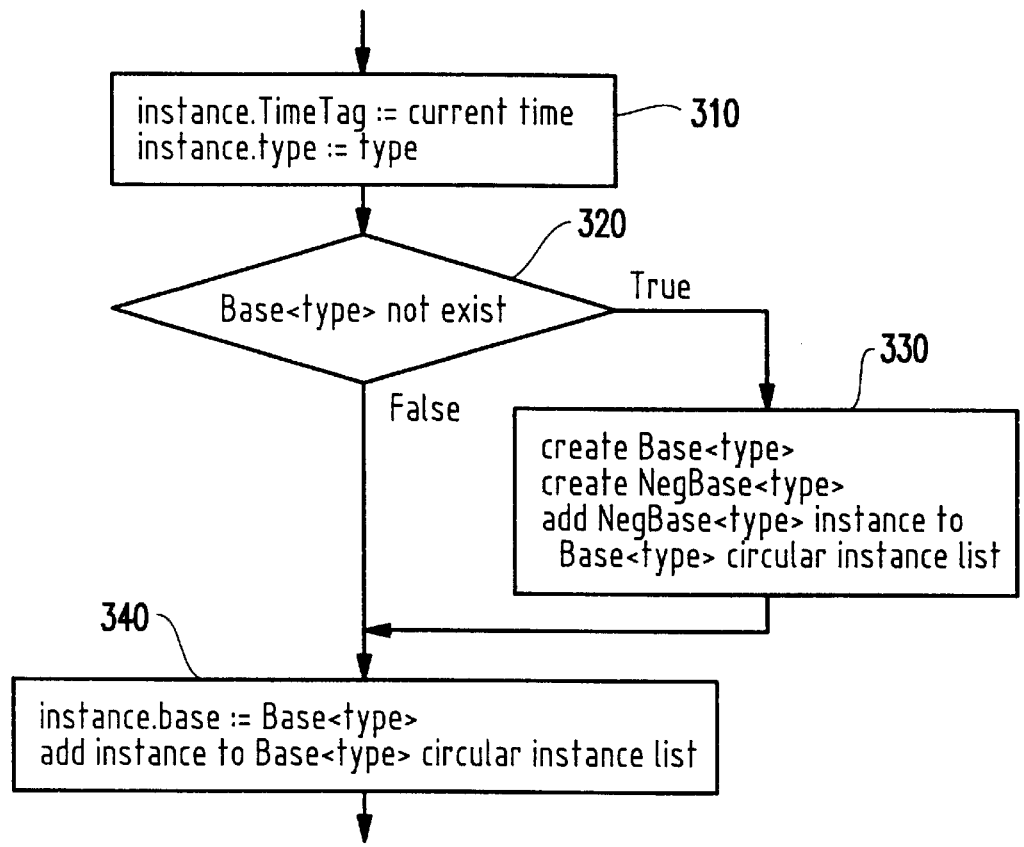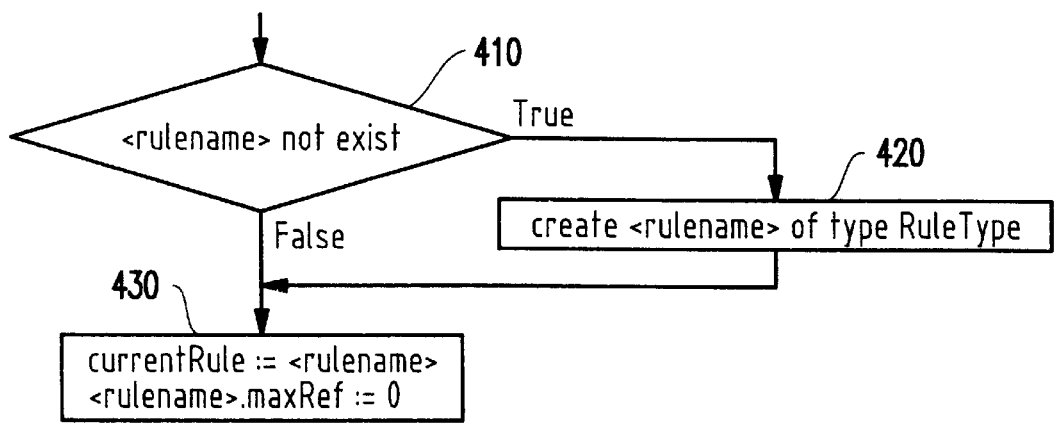

forall(name,type)

notforall(name,type)

match(condition)

AssignReferences(combo)

ResetPriorRefstoMax(combo,rule,maxref)

EvaluateCombinations(currentRule,condition,combo,ruleTrue)

NegativeRefs Matched(currentRule)

IncrementCombinations(combo,assign)

update(instance)

remove(instance)

FIG.16

RuleType

| Attribute Name | Initial Value | Description |
|---|---|---|
| maxRef | 0 | Number of reference variables defined for this rule |
| nextCombo | <self> | Next binding combination |
| nextBlocking | <self> | Next blocking binding combination |
| maxTimeTag | 0 | maximum time tag evaluated for this rule |
| [0..*] | array of RefTypes | pointers to binding references |
| neg | False | True = negatively quantified references used in this rule |

FIG.17

ComboType

| Attribute Name | Initial Value | Description |
|---|---|---|
| next | <self> | next binding combination in combination list |
| maxTimeTag | specified TimeTag | timetag of the dominant object in this binding combination |
| dominant | specified reference | index to the dominant (maxTimeTag) reference in this binding combination |
| [0..refs] | TimeTag-1 [dominant] :=TimeTag | timetags of each bound reference |

FIG.18

BaseType

| Attribute Name | Initial Value | Description |
|---|---|---|
| TimeTag | 0 | Timetag for this object |
| type | specified type | datatype of this object |
| base | <self> | pointer to the base instance for this object |
| next | <self> | pointer to the next object |
| prev | <self> | pointer to the previous object |

FIG.19
RefType

| Attribute Name | Initial Value | Description |
|---|---|---|
| ref | specified object reference | pointer to the variable used to reference an object |
| base | base instance for this object | pointer to the base of the list of instances of object of this type |
| isNeg | False | True=reference is negatively quantified |
| object | null | pointer to the object instance referenced |
| maxTime TagObject | null | pointer to the newest object instance of this type |

DECLARATION PROGRAMMING LANGUAGE EXTENSION FOR PROCEDURAL PROGRAMMING LANGUAGES

BACKGROUND OF THE INVENTION

1. Field of the Invention

The present invention generally relates to the field of computer implemented artificial intelligence and expert systems and, more particularly, to providing declarative programming capabilities within procedural programming languages such as JavaScript™, Java™ and Hypertext Markup Language™ (HTML™)

2. Description of the Prior Art

While it has long been accepted that any function can be derived from a general purpose computer using a small number of basic operations, many moderate or high-level programming languages have been developed which facilitate expression of algorithms for performance of specific types of functions and interfacing with programmers having particular types of expertise. For example, FORTRAN™ has been popular for many years for performing computationally intensive algorithms often encountered in scientific and engineering endeavors.

More recently, C++™ has become popular for so-called object-oriented programming. Even more recently, Java™, JavaScript™ and HTML™ have become popular for development of pages and links for communication interfaces over networks such as the internet World Wide Web™ since they are general purpose languages, source code and object platform independent and potentially secure while being similar to other popular languages such as C++™. JavaScript™, in particular, has allowed some small degree of intelligent behavior to be incorporated in such interfaces by inclusion of so-called in-line programs which are called and run upon presentation of the interface in which they are included. Java™ can be used to provide even more sophisticated behaviors in similar environments. All of these recently developed programming languages are essentially procedural within the context of a degree of concurrency characteristic of object-oriented programming.

Artificial intelligence and expert systems have received much attention in recent years in an effort to provide automatic adaptive behavior of computer functions. For example, by accumulation of correlations between conditions (e.g. stimuli) and an operator's choice between available options in response thereto, the operator's preferences and logic can be modeled and computer operation adaptively changed to anticipate those choices to facilitate the operator's interaction with the system. Similarly, complex logical responses to theoretically vast amounts of data can be analyzed and modeled in algorithms to simulate the analysis of an expert in a particular field of such data, operator input or a combination thereof. Such applications are particularly useful in complex and/or extensive design and scheduling applications to check user inputs against previously specified portions of the design to insure consistency, compatibility and the like.

Many artificial intelligence and expert system algorithms are implemented in familiar procedural programming in which an ordered sequence of steps embodied in the program is followed as the program is run. That is, the procedure implicit in the order of the steps as presented by the program is invariant other than for conditional or unconditional branching operations which are, themselves, reached only in the order in which they are placed in the algorithm. The order of steps specified in the program is resumed following the branching operation at the sequentially following address or at the address to which branching is directed. By the same token, the conditions upon which conditional branching is to be performed involve the comparison of a particular piece of information against a specific criterion. For that reason, imprecise or heuristic reasoning cannot be easily coded using a procedural language.

So-called declarative or rule-based programming has been developed to facilitate matching of complex patterns which are necessarily involved in simulation of reasoning and evaluation of information against imprecise criteria. At a very high level of abstraction, declarative programming principally differs from procedural programming by allowing operations to be specified without a specification of order in which they are executed. Thus, the equivalent of a conditional branching operation is a self-contained rule comprising a condition and an action which is permitted where appropriate to the condition. A potentially complex and extensive set or collection of rules may thus be applied to a collection of data (which may also be very large) to derive a subset of data for which all rules are true.

Evaluation against imprecise criteria can also be more easily achieved with declarative programming than with procedural since the operation performed on data can update or change parameters or attributes of the data objects being evaluated, including the creation or deletion of attributes and invalidation of prior matches. Performance of the matching operation and implementation of any user-specified priority is optimized by particular algorithms such as the so-called RETE algorithm or its derivatives and, more recently, the TREAT and "Lazy Evaluation" algorithms which are familiar to those skilled in the art. The TREAT and Lazy Evaluation algorithms, in particular, provide fast matching for less complex match situations with a significant reduction in memory requirements.

Many network environments present severe limitations on code size and complexity when code must be transmitted over the network at a relatively low data transfer rate imposed by the communication link. Therefore, use of procedural programming to provide intelligent behavior of the system is effectively precluded beyond a very low functional level in order to provide acceptable response time. In other words, programs which must be downloaded before they can be run and which are specific to information which is also transmitted over the network do not yield acceptable response times unless the amount of code contained in the application program is extremely limited. Such brief application programs are thus referred to as Applets. Other environments, such as monitoring and automatic control of geographically extensive manufacturing or communication systems, present requirements for rapid response over a very large body of data which cannot be accommodated by applying a complex procedural algorithm exhaustively against an extremely large body of data which may be widely distributed, as well.

In both of these environments, however, a requirement for source code and object platform independence has limited programming code to programming languages which are strictly procedural in nature. Therefore, there has existed no practical way to increase the very limited amount of intelligent behavior which can be made available consistent with acceptable downloading time. Similarly, there has been no alternative to procedural programming when source code and object platform independence must be accommodated which may make execution time unacceptable due to algorithm complexity, database size or both even if downloading of the program is not a factor in response time.

SUMMARY OF THE INVENTION

It is therefore an object of the present invention to provide a source code and object platform independent declarative programming language.

It is another object of the invention to provide a declarative programming language extension for an otherwise procedural programming language.

It is a further object of the invention to provide a technique, architecture and language which permits programming of complex artificial intelligence and expert system functions including provision for imprecise evaluation criteria and heuristic reasoning in minimal amounts of application code.

It is yet another object of the invention to provide for improved performance of complex matching functions over large databases including multi-key searches over multiple objects while maintaining security, source code and object platform independence and general applicability and similarity to other programming languages with small application code length and complexity.

In order to accomplish these and other objects of the invention, a declarative programming extension for a procedural programming language is provided which includes a plurality of functions encoded in the procedural programming language; at least two functions thereof including a rule for comparison with data objects and an operation to be performed to update a data object and specify a rule and object for a subsequent operation when said rule is satisfied.

In accordance with another aspect of the invention, a method of implementing a declarative language extension for a procedural programming language comprising a plurality of functions encoded in said procedural programming language; at least two functions thereof including a rule for comparison with data objects and an operation to be performed to update a data object and specify a rule and object for a subsequent operation when the rule is satisfied is provided wherein said comparison of the rule with data objects is restricted to processing required for a rule having highest priority.

In accordance with a further aspect of the invention, a method of declarative data processing in response to programming in a procedural language is provided including the steps of comparing a rule with an object and deriving a result, responsive to the result and contents of the rule as specified in connection with a conditional statement in the procedural language, performing at least one of a.) applying the current rule to another object, b.) specifying another object to compare with a rule, c.) specifying a rule to be applied to an object, and d.) updating attributes, relationships and a time tag of the object or removing the object from among objects of an object type to be compared with a rule.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a block diagram illustrating the architecture of an exemplary environment for application of the invention, FIGS. 3, 4, 5, 6, 7, 8, 9, 10, 11, 12, 13, 14 and 15 are high-level block diagrams illustrating operation of the invention, and FIGS. 16, 17, 18 and 19 are charts explaining exemplary datatypes which are used in accordance with a preferred embodiment of the invention.

DETAILED DESCRIPTION OF A PREFERRED EMBODIMENT OF THE INVENTION

Figure 1:
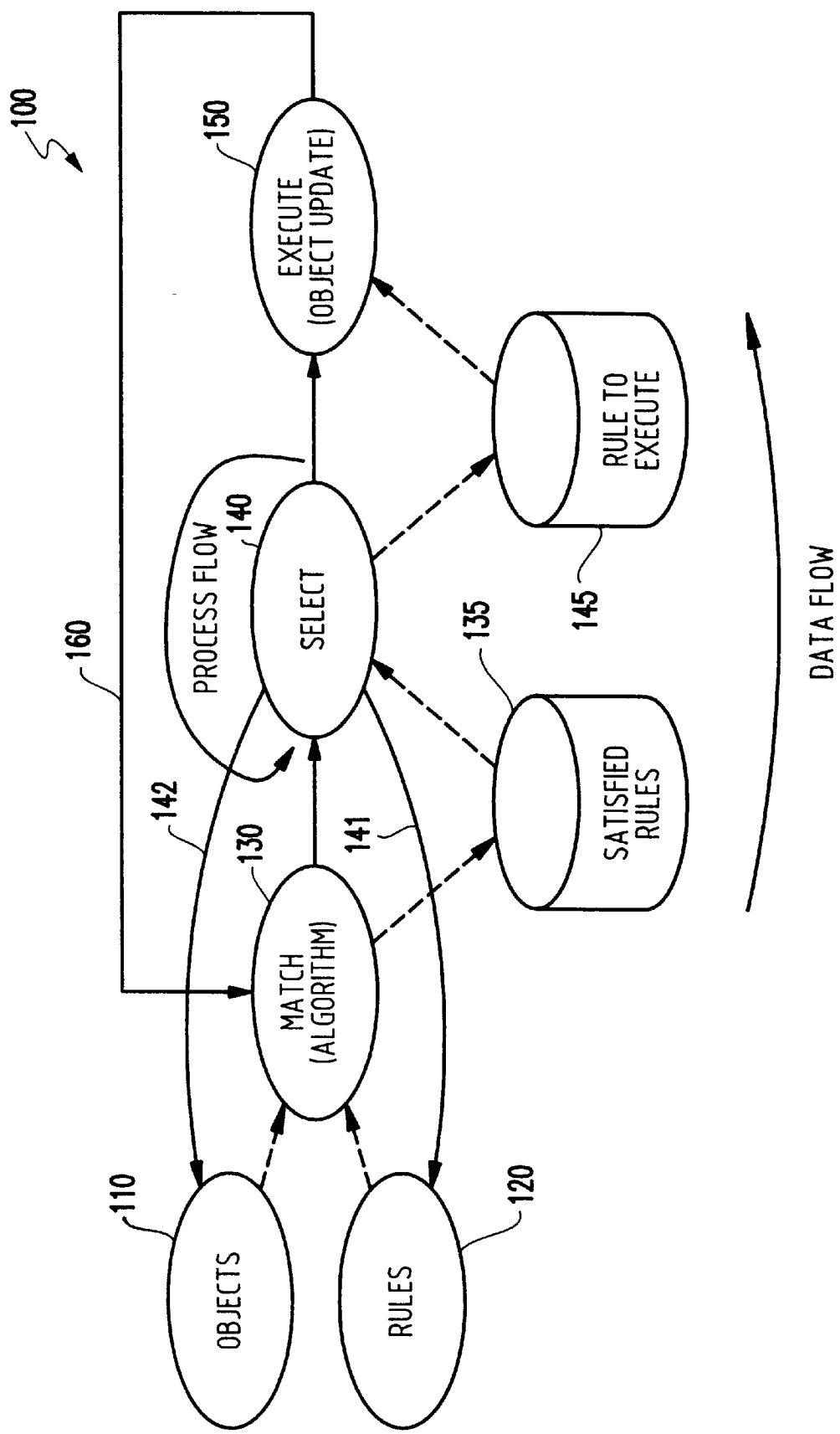
FIG. 1 is a high-level flow diagram useful for conveying an understanding of declarative programming sufficient to the practice of the invention.

Referring now to the drawings, and more particularly to FIG. 1, there is shown a high-level block diagram, much in the nature of a so-called Booch diagram, useful for conveying an understanding of declarative programming sufficient to the practice of the invention. It should be understood that any application of the invention to a specific reasoning problem is, to some extent, arbitrary in order to achieve desired functions appropriate to particular processing requirements and environments. While a generalized mode of operation is illustrated in FIG. 1 and, as such, will be recognized as being representative of known processing in accordance with declarative programming as well as very generally illustrating processing employed in or by the invention, no portion of FIG. 1 is admitted to be prior art as to the present invention.

Process 100, as alluded to above, performs the overall function of matching objects 110 having attributes and relationships with rules 120 specified as conditions and controlling actions to be permitted when the condition is met to develop a sub-set of objects for which all rules are true. The specifics of the matching algorithm 130 and selection algorithm 140 are unimportant to the basic principles of the invention but matching and selection processes and adaptations thereof in accordance with the invention are key aspects of the invention, as will be discussed below.

For example, the selection algorithm 140 preferably includes a user specified priority of application of rules (which serves to integrate the invention with a procedural language in accordance with an important feature of the present invention) and implements a priority selection among objects based on recency of creation or updating (e.g. creation of an attribute) of an object, as indicated by arrows 141 and 142, respectively. Similarly, the matching algorithm 130 is preferably an implementation, with enhancements to minimize code complexity and achieve a high degree of integration with procedural languages which will be discussed below, of a known Lazy Evaluation pattern matching algorithm.

When a match of an object to a rule is found, the satisfied rule is stored as indicated at 135 and the storage communicated to the selection algorithm 140. The selection algorithm 140 can then select a further rule (141) to apply to the current object or a further object (142) once a match has been found or the possibility of a match eliminated by the failure to match a particular rule or other determination made that a match will not be found. In the former case, the selection algorithm will also select a satisfied rule and its corresponding action from storage 145 to execute and perform the action specified in the rule as indicated at 150 which may update, create or delete attributes of the object. The object thus altered may then be returned for continuation of the matching procedure 130 as indicated by arrow 160 in accordance with the process flow indicated in FIG. 1.

In general, this process continues until all rules have been exhaustively applied to all objects in some order which is thus irrelevant to the eventual result as a result of the declarative nature of the programming but can be dynamically optimized or expedited in accordance with an order determined (by virtue of the declarative programming) during execution of the program, including the process flow determined, in prior declarative processing by the selection algorithm. It can also be appreciated that the selection of rules and objects may be made independent of program order and based on any desired criteria or made entirely random by the selection algorithm in accordance with the concept of declarative programming.

It should be appreciated in the following discussion of the invention, that it is a fundamental concept of the present invention, in contrast with prior declarative programming, to provide the selection algorithm functionally in explicit conditional constructs in procedural language embodying a rule or rule function statement. This approach simultaneously provides declarative processes easily and simply in a relatively few lines of procedural code while isolating the processing to the rules and objects, themselves, thereby providing reduction in hardware overhead requirements and performance enhancements which will be more fully discussed below. Further, by providing for updating of attributes and relationships of objects together with time tags associated with the update and removal of objects from list for evaluation, imprecise evaluation and heuristic reasoning may be readily developed while providing further performance enhancements to the Lazy Evaluation process.

Exhaustive matching of rules and objects is referred to as "eager evaluation" which, as can be readily appreciated, is very computationally intensive and may require use of large amounts of storage, particularly as the database and/or list of rules becomes large. It can also be appreciated that a potentially large proportion of the matching computations will not result in a rule execution and thus the computational overhead and storage space is essentially wasted. Therefore, a variant form of Lazy Evaluation is preferred for practice of the invention since, as alluded to above, it permits avoidance of computations which will not result in a rule execution by search and selection strategies.

While, in the general case, the matching procedure 130 and the selection strategy 140 are not critical to the methodology depicted in FIG. 1, Lazy Evaluation, detailed in "On the Performance of Lazy Matching in Production Systems" by Daniel P. Mirankar et al., published in Proceedings of the Eighth National Conference of Artificial Intelligence, 1990, pp. 685–692, and hereby fully incorporated by reference, is much preferred for practice of the invention. In essence, "lazy" evaluation (as opposed to "eager" evaluation characteristic of RETE, TREAT and numerous other known search algorithms, although some algorithms such as TREAT will perform simple tests on changed data to determine the necessity of evaluation) avoids computation for rules which may never be applied or "fired" and which may represent a large fraction of the total processing overhead. Lazy Evaluation also embodies a selection strategy based upon recency of updating of an object, as alluded to above. Thus, after performance of an initial "best-first search" for a rule which is satisfied, further processing is delayed until the updating of an object produces the possibility of a further match being found.

The enhancements to the Lazy Evaluation algorithm in accordance with the invention are directed to permitting simple and straightforward integration of the reasoning specification with an underlying procedural programming language such as JavaScript™ and Java™ and reducing the amount of code required for the desired implementation. It should be understood that in the context of internet applications, the underlying Javascript™ language or Java™ compiled code must be downloaded, interpreted and executed on the client processor as part of the customary web page processing. Therefore, downloading of large amounts of code would compromise overall performance of a web page or a browser but does not constitute an additional transmission or computational burden relative to ordinary web page processing when the invention is employed. It should also be understood that while the following discussion may be, in part, specific to the preferred implementation of the invention as an extension to the Java™ language, those skilled in the art will appreciate and understand how the principles of the invention are applicable to other procedural programming languages.

The key distinction of the variant form of Lazy Evaluation as provided by the invention is the structuring of components of the system to isolate processing to the rules and objects, themselves, the embedding of modifications of the matching and selection algorithms 130, 140 to do so and to avoid global stacks of objects and rules and alpha memory lists. By way of general introduction, as part of the algorithm, processing is isolated to the rules and objects as well as the data needed to perform that processing. Hence, global stacks and alpha memory lists (which are also global, cross-rule object data) are not used. As a result, corresponding structures are only used when the rule is determined to be necessary, delaying the need for such structures until the latest possible time.

More specifically, rule condition evaluation is thus isolated to the rule and tracking of object modification is isolated to the object. In essence, this modification of the known algorithm allows the Lazy Evaluation of rules rather than merely evaluating rule conditions. Localization of processing and definition to the rules and objects thus facilitates integration with procedural languages and the necessary algorithms may be implemented as a small set of functions executable in the manner of declarative programming in accordance with a language which may be otherwise wholly procedural in nature.

Additionally, the invention provides for evaluation of rules in lexical priority order as may be freely defined in the application program. The state search approach of Lazy Evaluation thus preserves recency within the priority and a time-ordered list of objects may be easily maintained in accordance with object type. When a rule fires for an object (e.g. after modification) all rules are again evaluated for the object in priority order.

Advantages over Lazy Evaluation provided by these differences include elimination of most overhead when rules are not being used since only lists of rules need be maintained. Storage requirements are limited to one storage element for each object instance rather than an element in each alpha memory (which associates the object with a matched rule condition). Evaluation of rules may be done directly in an existing language, even if otherwise wholly procedural, and, therefore, compilers or pre-processors are not needed to convert rules into programs and/or data, thereby simplifying the system and enhancing performance.

To realize these advantages, the preferred implementation of the invention utilizes two basic constructs: working memory objects (WMOs) which may be defined in the same manner as objects in any underlying language with the inclusion of a statement referred to hereinafter as a ruleobject statement identifying the object type and defining the objects in a class which will be used in a rule and rules which, as noted above, define conditions and operations or actions appropriate to those conditions. An exemplary syntax for a WMO in JavaScript™ is

```
function object_type(property1value, . . .
        propertyN value)
    this.property1 = property1 value;
    this.property2 = property2 value
            .
            .
            .
    this.propertyN = propertyN value
        ruleobject(this, "object_type");
```

An example of a WMO for monitoring functionality of a communication system or device is:

```
function moduleType(id, connectsTo, output)
    this.id=id;
    this.connectsTo=connectsTo;
    this.output=output
    this.status="OK";
    ruleobject(this, "moduleType");
```

In accordance with the preferred implementation of the invention as an extension of the JavaScript™ language, rules have four parts:

1.) a rule statement which defines the beginning of a rule and its name (which should be unique within the window or application),
2.) a reference definition which defines reference variables that refer to instances of a given object type in the condition and action parts of the rule,
3.) a condition statement which is essentially a conditional branch or "if" statement with the match function as its condition (which may be in the form of a string argument representing a Boolean expression and may contain other objects and variables, as needed for the application), and
4.) one or more action statements (which may use reference variables defined in the reference definition for the rule).

Reference variables are based on the types of quantification found in formal logic, such as: forall(reference_name, type) which specifies that the action will be attempted for every instance of the specified object type which satisfies the rule and notforall(reference_name, type) which specifies that the action of the rule will be attempted if none of the objects of the specified type satisfy the rule. The actions are provided by the system from the underlying procedural logic augmented with 1.) update(object) which identifies that values (e.g. attributes) of an object have been changed and that the changed values are to be used in further evaluations and
2.) remove(object) which specifies that the object should be removed from consideration in evaluation of subsequent rules (but does not remove the object from the database).

Therefore, an example of a rule corresponding to the above WMO example is:

```
rule("find_fault");
    forall("source", "moduleType");
    forall("sink", "moduleType");
        if (match("source.output == 'good' &&
            sink.output == "bad"
            source.connectsTo = sink.id")) {
        sink.status = "bad";
        update(sink)
        continue;}
```

The term "find_fault" is the unique name of the rule, the "forall" statements specify the types of objects and extent of application of the rule (in this case, all combinations; serially connected moduleTypes being specified by "source.connectsTo=sink.id" in the "if statement"), the "if" statement specifies the condition and "sink.status=bad" is the action to be taken for each object that satisfies the rule. Update(sink) specifies that the object "sink" has been modified and should be reevaluated in other rules.

Additionally, as a perfecting feature of the invention, rules can be grouped to facilitate their use together. Grouping can be easily accomplished by stating the rules to be grouped in a "while" statement or its equivalent in any procedural programming language (e.g. a DO loop) to apply the rules repeatedly until processing is complete. The global Boolean variable "inferencing" is set by the system when rule processing is complete. The variable may also be set in the action statement of a rule or by user-provided code to terminate processing. Exemplary (statement oriented) syntax is

```
inferencing = true
while (inferencing)
    rule1
    rule2
        .
        .
        .
    ruleN.
```

In view of the foregoing, it can be seen that quite complex rules and actions, including specification of processing order of objects and rules in accordance with declarative programming concepts, attribute and relationship modification for performing imprecise evaluation and heuristic reasoning and object removal from consideration as a performance enhancement, can be specified in relatively little code and that matching and processing can be carried out rapidly with minimal computational and storage overhead if the invention is implemented in accordance with an enhanced variant form of with Lazy Evaluation, discussed above, as is preferred. Therefore, the invention permits the downloading of the program and its execution within an acceptable response time comparable to downloading of a page over a network which includes the downloading of the underlying procedural language. In regard to the preferred implementation as an extension to the JavaScript™ language, the invention may be applied to HTML by specifying the above rules as JavaScript™ statements and calling support functions and definitions (e.g. as "JavaRule") by specifying:

<SCRIPT LANGUAGE="JavaScript" SRC= "javarule.js> or the like. This will be recognized by those skilled in the art as an HTML (the web page definition language) construct that identifies a section of text as JavaScript™ code and thus is effectively the interface to the underlying language. Even if not constrained by network communication link limitations, the enhancements to the Lazy Evaluation methodology provided by the invention allow performance of complex expert system analyses in much reduced response time for accommodation of large databases of objects while providing source code and object platform independence.

FIG. 2 describes an exemplary web-based environment in which the invention operates. In the typical scenario, a user 200 requests a web page 220 using a Web Browser 210 on the user's Web client 230. The Web Client 230 requests the web page HTML and any related JavaScript code 260, which could contain embedded JavaRule object and rule specifications, from the Web Server across a network, indicated at 270, through a file server 250 at web server 270. The Web Server's File Service 250 locates the appropriate HTML and JavaScript/JavaRule code and transmits them back to the Web Browser 210 On the user's Web client 230. The HTML Interpreter 212 of the Web Browser then interprets the HTML generating displayable images and text on the user's screen. When the HTML contains embedded JavaScript code, this is interpreted by the Web Browsers JavaScript Interpreter 214 to perform various actions including modification of the images and text on the web page and computation of data values for display. When the JavaScript code contains embedded JavaRule object and rule specifications in accordance with the invention, as described above, the JavaRule code 240 is invoked to perform the pattern matching and rule execution process described in FIG. 1. The execution of rules can perform any action allowed by JavaScript code 240' including modification of the images and text on the web page and computation of data values for display.

While the description above and in subsequent text focuses on the embodiment of the invention in JavaScript, equivalent embodiments can be created in other languages such as Java and ActiveX to perform the same functions.

FIGS. 3 through 15 provide a detailed description of the operation of the invention. FIGS. 3 through 7, 14 and 15 provide a detailed description of the operation of the functions provided by the invention to extend the base procedural language. As mentioned in the previous sections, the functions provided by the invention to extend the procedural language are ruleobject, rule, forall, notforall, match, update and remove. FIGS. 8 through 13 provide a detailed description for the additional processes that support these functions in accordance with the principles of the invention.

FIGS. 3 through 15 describe the operation of the invention in terms of the manipulation of a small set of datatypes constituting a key feature or aspect of the invention. These datatypes, which should be considered as exemplary and not by way of limitation, are described in FIGS. 16 through 19, which will be self-explanatory to those skilled in the art in view of the explanation of the meaning of each of the attributes of the datatypes used by the invention included in these Figures.

FIG. 3 describes the operation of the ruleobject function that is used in each object of the underlying procedural language which is to participate in pattern matching and rule execution. The ruleobject function is invoked whenever a new instance of an object is created. When invoked, it sets the timetag of the object to the current time and initializes the type attribute to the type of the object as indicated at 310. If a basetype element does not exist for the object, as determined at 320, it creates one and a pseudo-instance to be used for negatively quantified references, as illustrated at 330. The basetype element forms the head of a list of all instances of a given object type. The ruleobject function then points the object to the basetype and adds the object to the basetype list for that object type, as shown at 340.

FIG. 4 describes the operation of the rule function that defines a rule. The rule function first checks (410) to see if the rule is already defined and creates an instance of ruletype if it is not, as shown at 420. This test is necessary because the rule definition may be executed repeatedly in the evaluation of a set of rules. Once the ruletype object is created, the rule name and number of references is initialized, as shown at 430.

Figure 5:
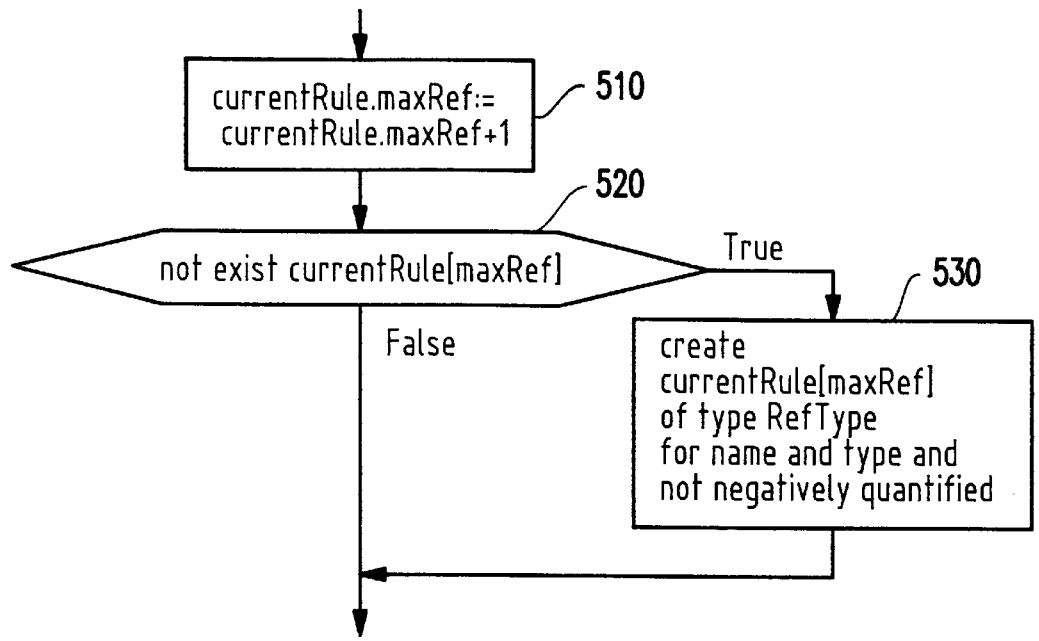

FIG. 5 describes the operation of the forall function that defines a variable (pointer) that will be used to reference instances of objects of a specified type that will participate in pattern matching and rule execution. Essentially, this is a simple statement that performs an action if the condition (notexist currentRule[maxRef]) is met and does nothing if it is not. The forall function first increments the number of rule references for the current rule, as illustrated at 510. Then, if necessary, as determined at 520, forall creates a reftype object to record the reference variable it defines and the type of object it references, as illustrated at 530. Like the rule function, this function will be executed many times in the evaluation of a set of rules and the creation and initialization of the reftype object is only necessary the first time.

Figure 6:
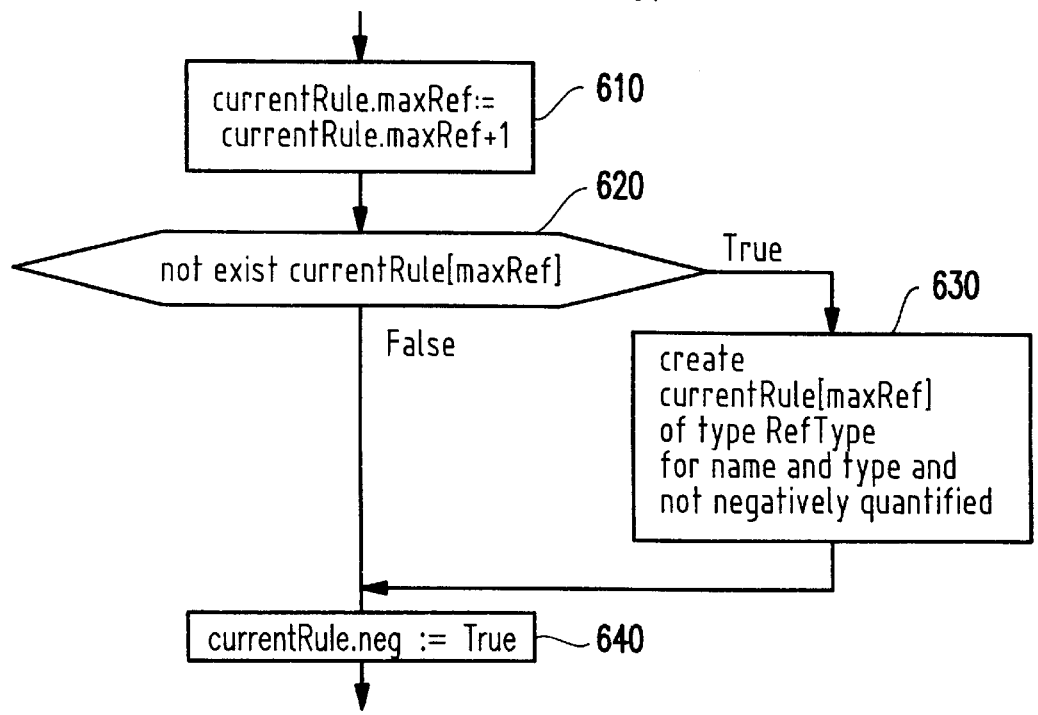

FIG. 6 describes the operation of the notforall function that defines a variable (pointer) that will be used to reference instances of objects of a specified type that will block pattern matching if any instances pass the tests in the rule condition. The logic is similar to that of forall (FIG. 5), as illustrated at 610, 620 and 630 with the addition that the reftype object is marked, as illustrated at 640 to indicate that the reference is negatively quantified.

Figure 7:
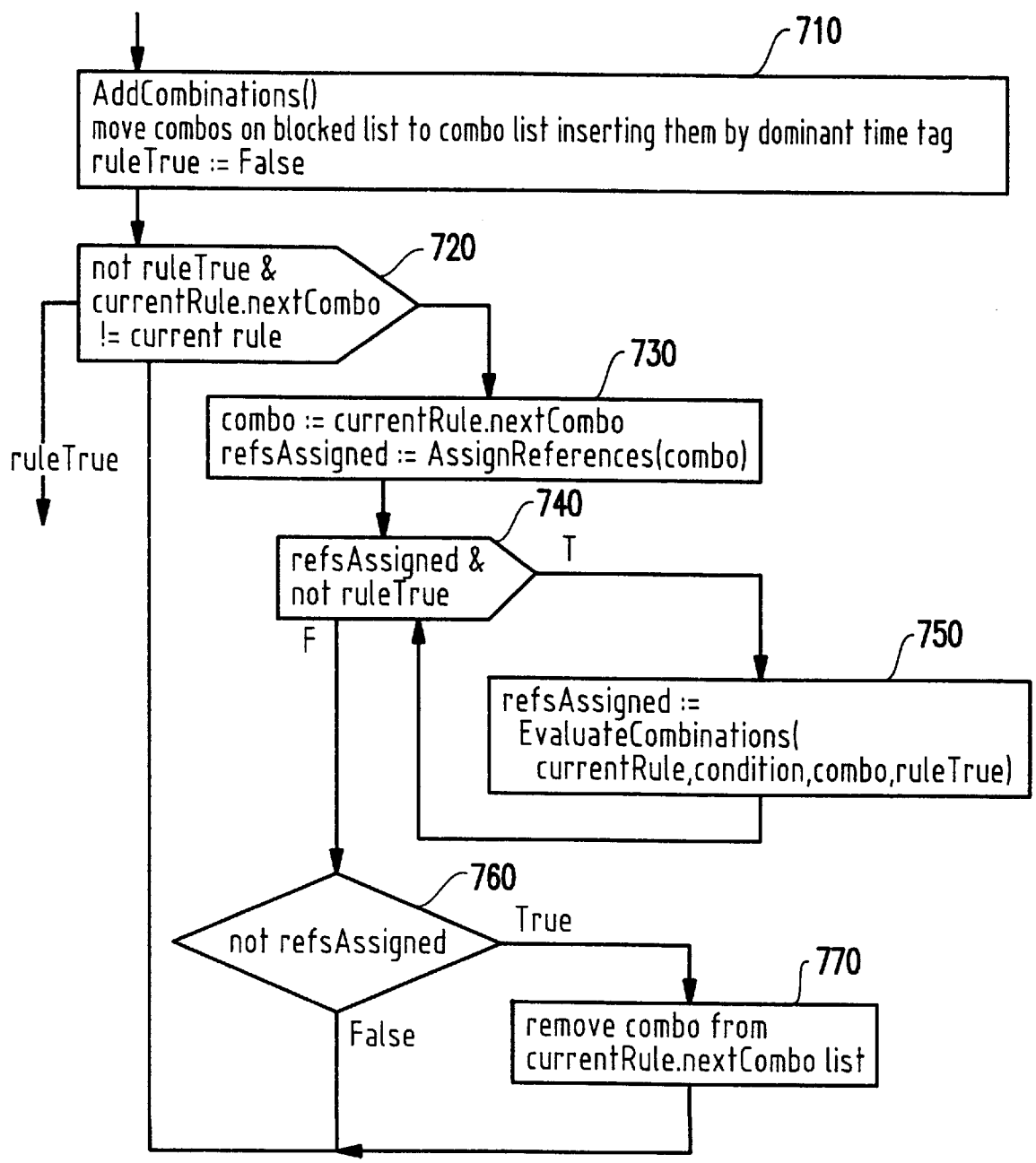

FIG. 7 describes the operation of the match function which is the central operation of the invention. The match function assigns values to the reference variables (pointers to objects), evaluates the rule condition using the reference variable assignments and returns True if it's pattern is matched by the instances. If the pattern is not matched by the current assignment of reference variables, a new set of reference variable assignments is computed and matching attempted. This continues until all possible reference variable assignments are tested or until a match is found.

The operation of the match function in FIG. 7 begins by adding any new combinations (resulting from new instances of objects that are referenced by this rule) to the list of combinations to evaluate using the AddCombinations function, as illustrated at 710. Note that a combination in this description is a set of references to objects. If the rule involves negatively quantified references, the list of combinations that block the execution of the rule is also added to the list of combinations to evaluate as also illustrated at 710. Since negatively quantified references will block pattern matching if any instances pass the tests in the rule condition, these must be reevaluated (740) until changes are made (at 750) in the working memory of the system that eliminate them or cause them to evaluate false in the tests.

Once any new combinations are assigned at 750, the match function repeatedly, as illustrated at 720, assigns the reference variables with pointers to the objects to attempt matching on the AssignReferences function, as illustrated at 730, and, if assigned, as illustrated at 740, evaluates the matches using EvaluateCombinations, illustrated at 750, until a match is found or no more combinations exist to evaluate, as determined by 740. Combinations are maintained on a list containing the search state of references to the last combination of object instances evaluated. When references cannot be assigned because all possible combinations have been exhausted, as determined at 760, combination state is removed from the combination list, as illustrated by 770.

Figure 8:
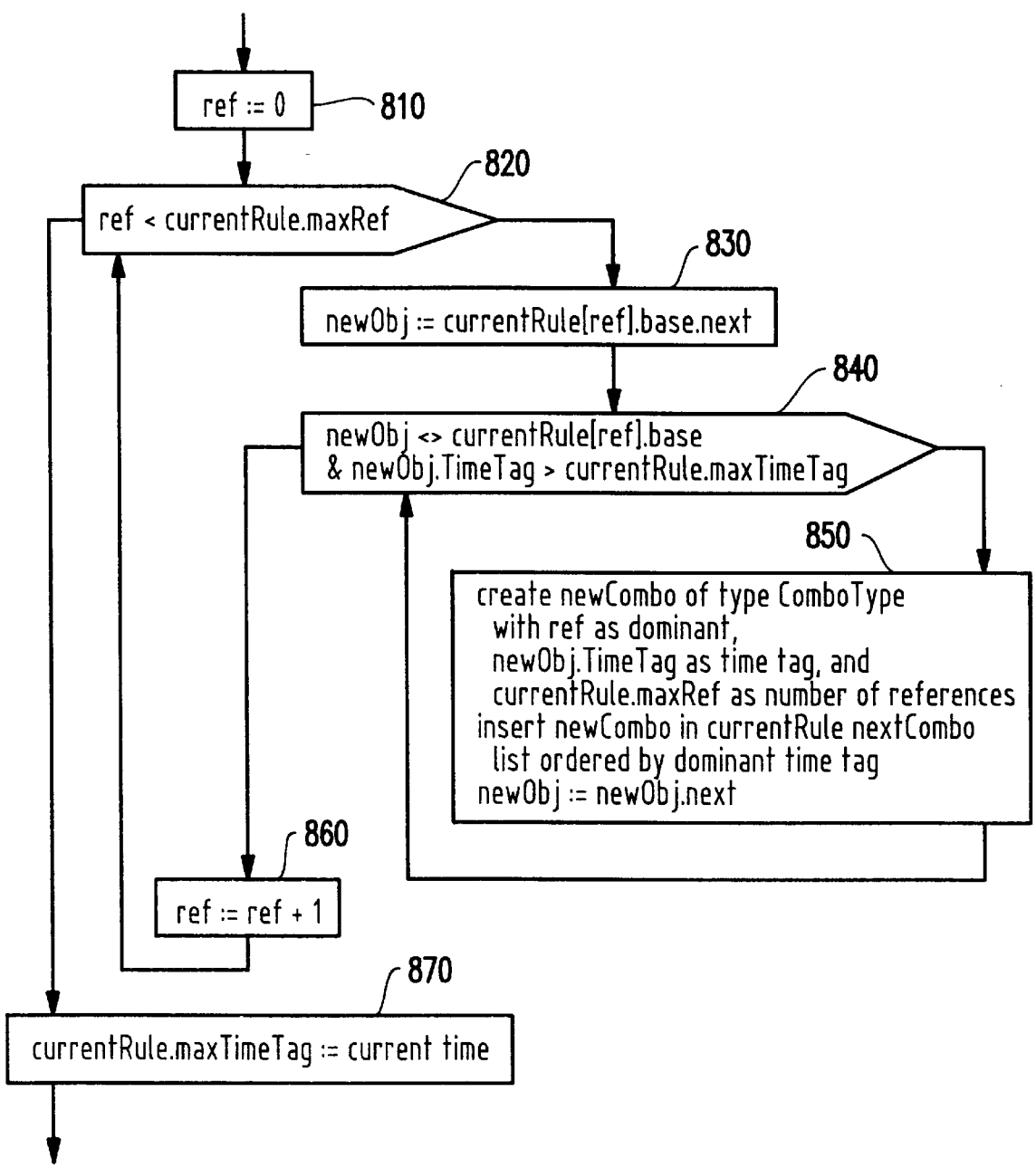

FIG. 8 describes the operation of the AddCombinations function. AddCombinations searches the list of objects of each type participating in the rule (determined by the rule references) for instances that have a timetag newer (greater) than the timetag that was present when the rule was last evaluated. The search is indexed by the "ref" variable beginning with the first object, as illustrated at 810, and continues until all references, as indicated by maxRef, have been searched, as illustrated by 820 and 860. When an object meeting this criteria is found, by the search illustrated by 830 and 840, a new combination is created with this object as the "dominant" object, as illustrated at 850. The combination consists of a list of references to objects that can he bound to this rule for evaluation. The dominant object designates the newest object in a combination (e.g. a list of references to objects) which is evaluated against all other object instances with lesser timetags. After any new combinations (i.e. resulting from new objects being created or existing objects modified) are added to the list of combinations to evaluate, the maximum timetag for the current rule is set to the current timetag to ensure proper selection of new object combinations in the future as illustrated at 870.

Figure 9:
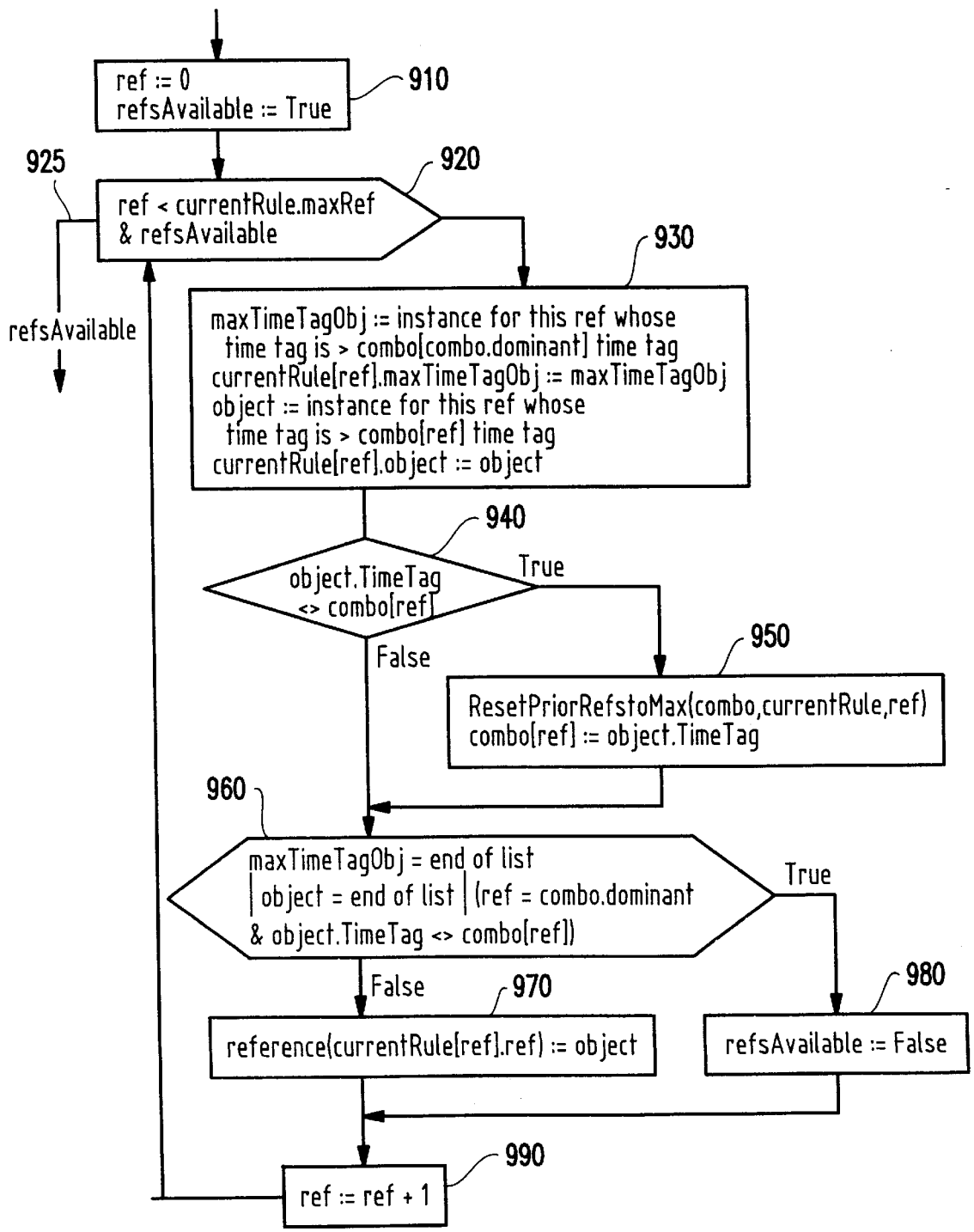

FIG. 9 describes the operation of the Assignreferences function, alluded to above in the discussion of FIG. 7, which assigns the reference variables with pointers to objects. Assignreferences works like a count-down counter, initialized at 910. It first attempts to assign each reference with a pointer to the instance referenced (by timetag) in the combo reference array. This assignment begins with the first (0) reference and proceeds to the number of references in the rule as indicated by maxRef as long as references are available, as illustrated at 910, 920 and 930.

To support this, the first (oldest) object whose timetag is greater than the dominant timetag for this combination is found and the object whose timetag is greater than the current combination reference object is found and set to maxTimeTagObj and object, as illustrated at 930. If the currently referenced object is not found, it resets the prior "digits" (reference to the combination) to the maximum value (maxTimeTagObject) for that object type (using ResetPriorRefstoMax which will be described below with reference to FIG. 10) and continues with the next available (next newest) instance, as illustrated at 950. If the object that is not available is the dominant object (due to this object being removed), as illustrated at 960, then the combination is considered completely evaluated and the function exits, as indicated at 925 without assigning a complete set of references as illustrated at 980 with its interaction with 920. Otherwise, the value of the reference is set to the next object for this reference as illustrated at 970. Processing then proceeds to the next object as illustrated at 990.

Figure 10:
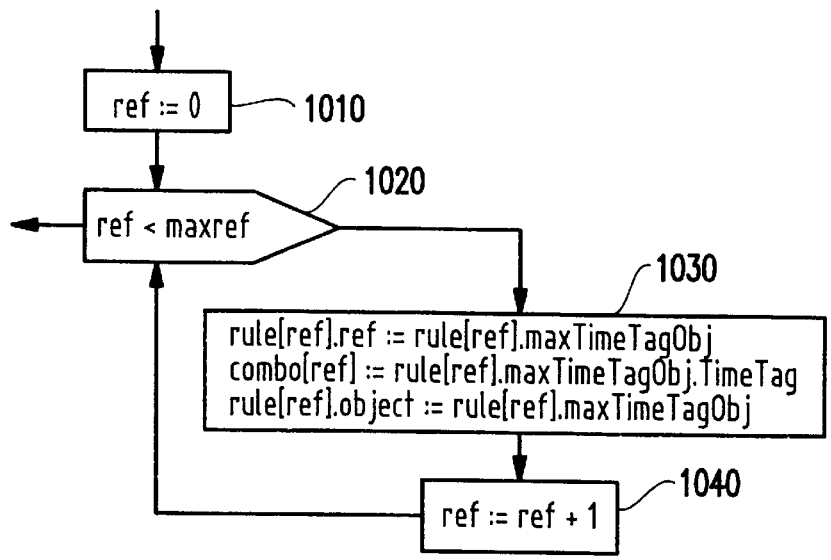

FIG. 10 illustrates the operation of the ResetPriorRefstoMax function which simply resets the combination index values for all references prior to a specified one to the maximum timetag (newest) object that is not newer than the dominant object for the rule. The determination of which object is the maximum timetag object is done as part of the processing in AssignReferences.

Figure 11:
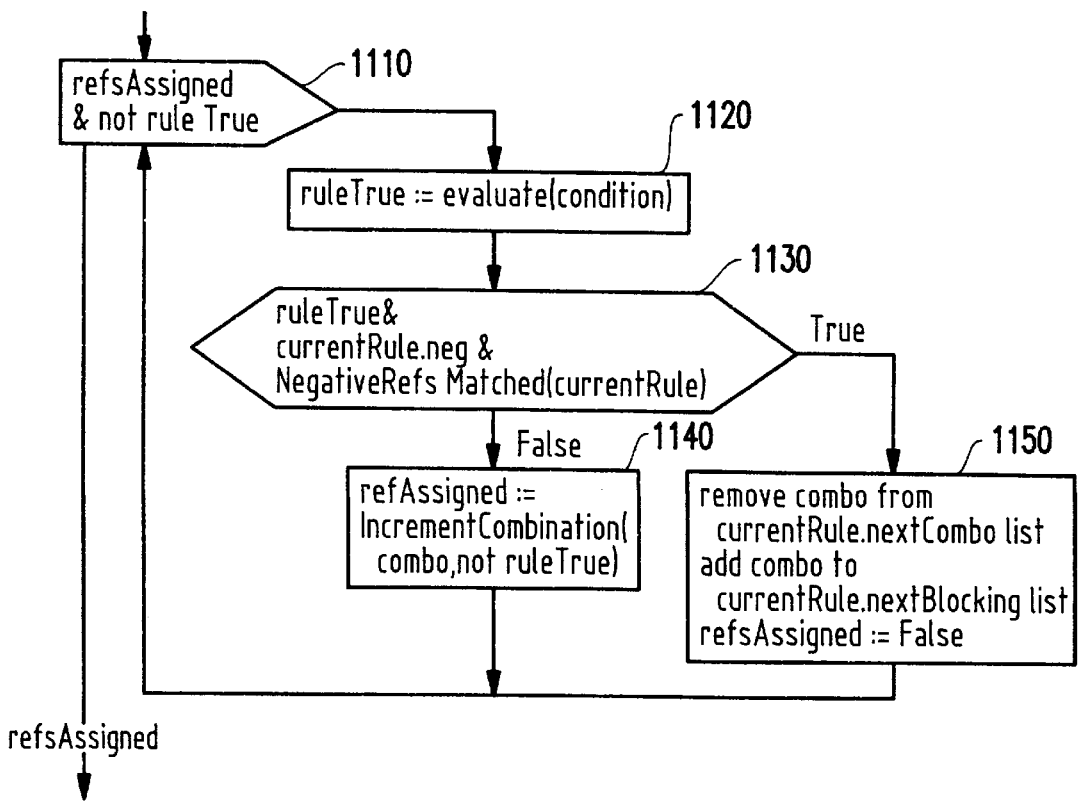

FIG. 11 describes the operation of the EvaluateCombinations function. Given a current assignment of reference variables to object instances, determined at 1110, EvaluateCombinations first evaluates the rule condition using those assignments at 1120. If the condition evaluates true and the references are not negatively quantified or none of the negatively quantified references are matched (as illustrated by 1130 and determined by the NegativeRefsMatched function, which will be described below with reference to FIG. 12) at 1120 then the rule is considered to evaluate to true and the function returns to 1110. If the rule condition evaluates false, then the combination is "incremented" (advanced to the next combination) using IncrementCombinations, which will be described below with reference to FIG. 13, as illustrated at 1140 and the process continued by looping to 1110 until no more combinations are available for this combination record or a combination evaluates true. If the rule condition evaluate true but one or more of the bindings are negatively quantified references, the bindings must block the execution of the rule for this combination. This is accomplished by placing the combination on the blocking list associated with the rule and advancing to the next combination in the list of combinations to be evaluated, as illustrated at 150.

Figure 12:
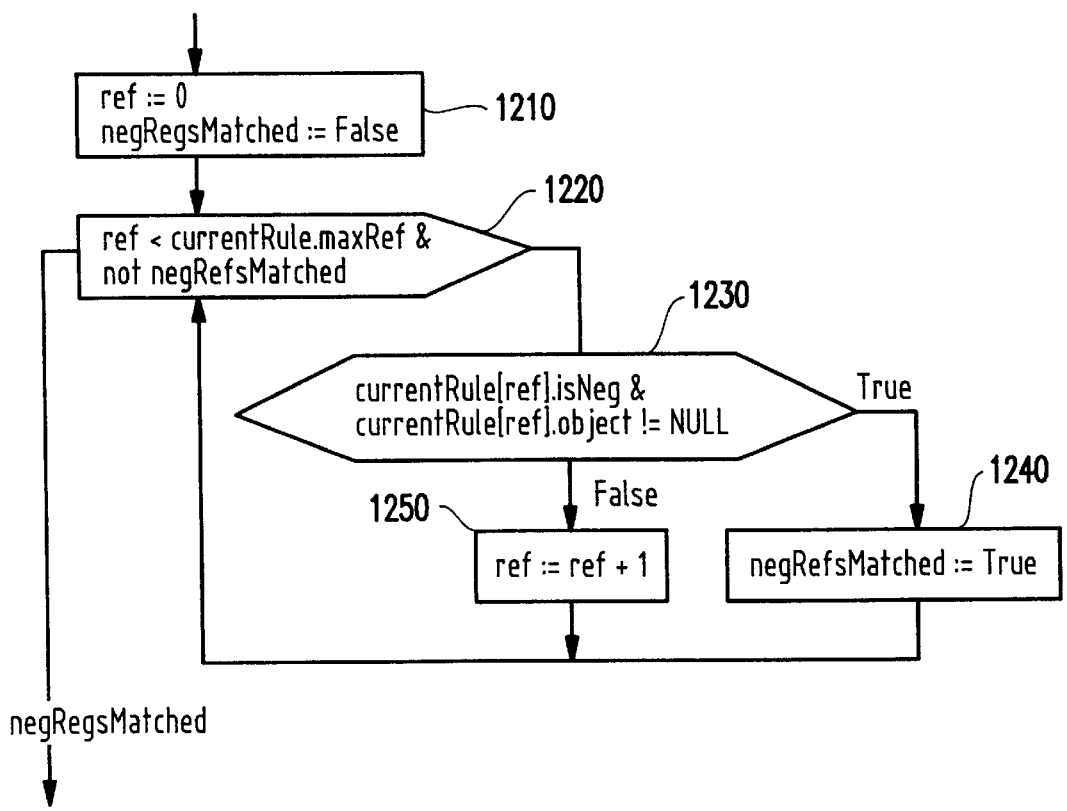

FIG. 12 describes the operation of the NegativeRefsMatched function which determines if any of the current references refers to a negatively quantified object as alluded to in the discussion of FIG. 11. Since conditions involving negatively quantified object references are only true if no object exists that evaluates true, some special coding must be done in the condition specification to accommodate these references. Tests against negatively quantified object references must be augmented with a special test to determine if the reference is set to the null value provided by the user in the rule's "if" condition. By using a special pseudo-instance which points to an instance with the null pointer, the AssignReferences and IncrementCombinations functions will assign a negatively quantified reference to null after all existing object instances have been evaluated. When a combination consists of null references in all negatively quantified references, it indicates that no negatively quantified reference binding exist which makes the condition true allowing it to be evaluated to true. The NegativeRefsMatched function accomplishes this by searching all references, from 0 to maxRefs, in the current rule as illustrated by 1210, 1220 and 1250, A flag indicating whether negative references have been matched is maintained, as illustrated in 1210, and set, as illustrated at 1240, if an object reference is made to a negatively quantified object, as illustrated at 1230.

Figure 13:
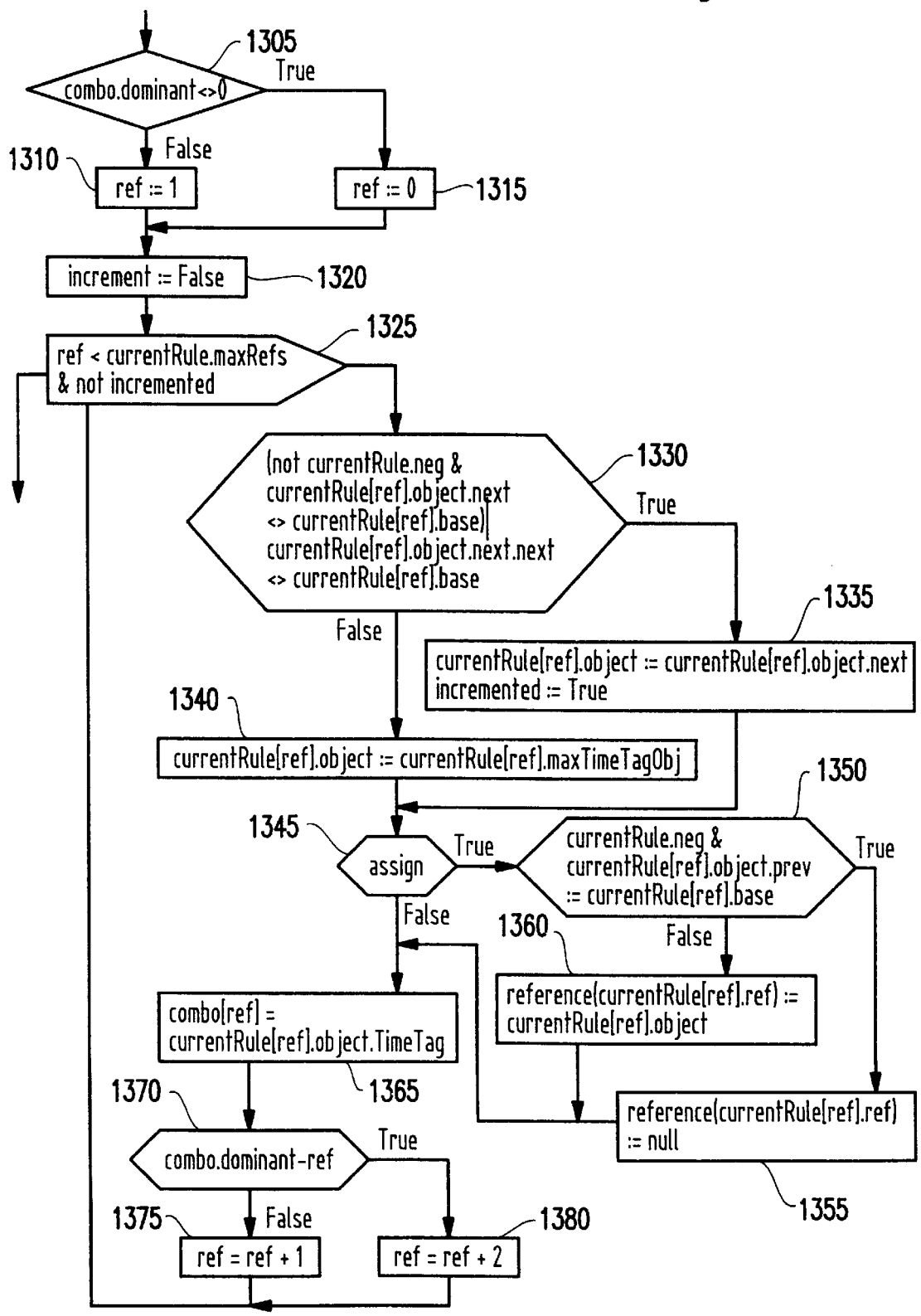

FIG. 13 describes the operation of the IncrementCombination function. This function uses logic similar to the AssignReference function to increment the combination from the current value to the new value. It works by searching the combination array for a reference that can be advanced to the next newest object instance, as illustrated at 1305,1310,1315,1320,1325, 1375 and 1380. This search is slightly complicated by the fact that the dominant reference cannot be incremented and therefore it is not eligible to be the start of the search, as illustrated at 1305, 1310 and 1315, or the next object to check, as illustrated at 1370, 1375 and 1380. If the object instance referenced is already at its oldest value, it is reset to the newest value and the next reference is tested for ability to be incremented, as illustrated at 1330 and 1340. Otherwise, the reference in the combination array is incremented (i.e. a pointer to the next object is assigned according to timetag), as illustrated at 1335 and 1365. This logic also makes allowance for the processing of negatively quantified references by setting the value of the reference variable to null when the pseudo-instance is encountered. as illustrated at 1350 and 1355. The option is also provided to assign the value of the reference or not by using the "assign" flag as illustrated at 1345, 1350 1355 and 1360. This feature is used by the arrangement of FIG. 11 at 1140, as discussed above.

Figure 14:
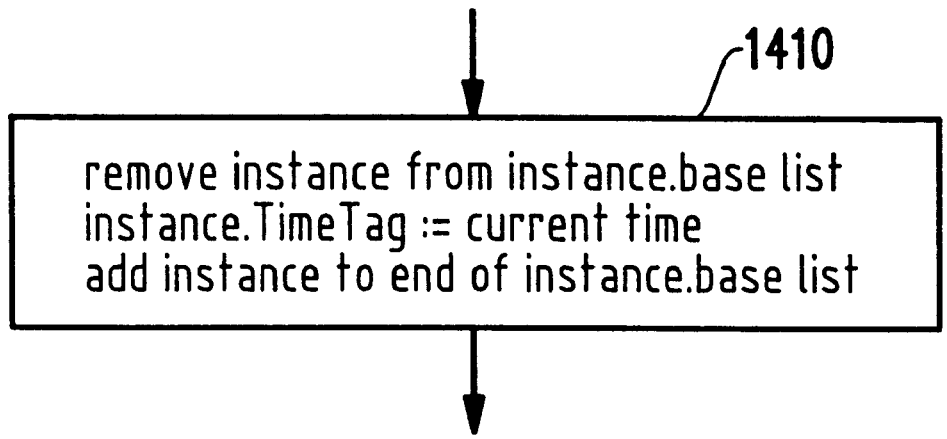

FIG. 14 describes the operation of the update function. This function removes the object from the list of objects of its type, changes its timetag to the current timetag, and adds the object to the end of the list of objects of its type, as indicated by the procedural steps listed at 1410, in accordance with the underlying procedural language.

Figure 15:
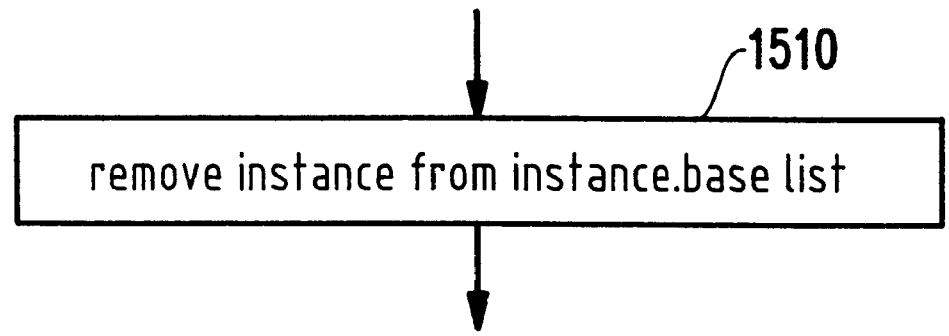

FIG. 15 describes the operation of the remove function which removes an object from the list of objects of its type thereby eliminating it from further matching operations, as indicated at 1510.

The above description defines a preferred embodiment of the invention that meets the above enumerated and other objects of the invention. The preferred embodiment accommodates platform independent languages implemented by web browsers and other tools that are platform independent. The invention defines and supports an object and rule specification language that is an extension of an existing language. These extensions and the associated support logic in accordance with the invention provide an architecture that permits programming of complex artificial intelligence functions involving pattern matching, search and complex object representation with a minimal amount of programming. Their implementation as extensions of programming languages permits the use of arbitrarily complex functions supporting imprecise and heuristic reasoning techniques. The underlying algorithms being based on Lazy Evaluation techniques combined with efficient data representations isolated to the object and rule structures provides a high-performance implementation that requires only small amounts of executable code making the invention applicable to interpretive and other constrained resource environments where more complex algorithms could not be used.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computing system for generating and utilizing a declarative programming extension for a procedural programming language, comprising:

means for generating a program, using syntax and development tools of the procedural programming language, including a plurality of code sections comprising a plurality of functions encoded in said procedural programming language with a declarative programming extension;

a plurality of code sections of said computer code comprising a plurality of functions encoded in said procedural programming language with the declarative programming extension, each said function encoded in a code section; at least two functions of said plurality of functions including a rule for comparison with data objects and an operation to be performed to update a data object and specifying a rule and object for a subsequent operation when said rule is satisfied; and means for executing said program including said plurality of code sections, thereby providing an implementation suitable for use in a resource constrained system using syntax and development tools of existing said procedural programming language.

2. A computing system for generating and utilizing a declarative programming extension as recited in claim 1, wherein a ruleObject function of said plurality of functions is invoked when an instance of an object is created to set the time tag for the instance of the object at the current time and initializes the type attribute of the instance of the object to a base type of a given object type.

3. A computing system for generating and utilizing a declarative programming extension as recited in claim 1, wherein a rule function of said plurality of functions contains a unique name of a rule and a definition of the variables referring to instances of a given object type, an action corresponding to the rule and a condition statement.

4. A computing system for generating and utilizing a declarative programming extension as recited in claim 1, wherein a forall function of said at least two functions of said plurality of functions contains a pointer for referencing instances of an object type and an action, said function when invoked, applies a rule to an object and invokes the action if attributes or relationships of the current object satisfy a current rule.

5. A computing system for generating and utilizing a declarative programming extension as recited in claim 1, wherein a notforall function of said at least two functions of said plurality of functions contains a pointer for referencing instances of an object type and an action, said function when invoked, applies a rule to an object and invokes the action only if attributes or relationships of none of the objects of the object type satisfy a current rule.

6. A computing system for generating and utilizing a declarative programming extension as recited in claim 1, wherein a match function of said plurality of functions contains a plurality of conditions containing pointers to objects and a reference variable assignment of a rule, said function comparing attributes and relationships of objects with said rule for only those objects which have not been previously compared until all combinations of objects compared or the condition evaluates to true.

7. A computing system for generating and utilizing a declarative programming extension as recited in claim 1, wherein an update function of said plurality of functions alters a time tag of an object to indicate that it should be reevaluated by said match function.

8. A computing system for generating and utilizing a declarative programming extension as recited in claim 1, wherein a remove function of said plurality of functions removes an object from a list of objects, and wherein objects in said list of objects are of a common type.

9. A computing system as recited in claim 1, wherein said comparison of said rule with data objects is restricted to processing required for a rule having highest priority.

10. A method of implementing a declarative language extension for a procedural programming language comprising the step of generating a plurality of functions encoded in said procedural programming language using syntax and development tools of the procedural program language; wherein the step of generating a plurality of functions further comprises the steps of:

for at least two functions, generating a rule for comparison with data objects and an operation to be performed to update a data object specifying a rule and object for a subsequent operation when said rule is satisfied, wherein said comparison of said rule with data objects is restricted to processing required for a rule having highest priority, thereby providing an implementation suitable for use in a resource constrained system, wherein said plurality of functions form a part of a computer program.

11. A computer implemented method of declarative data processing while executing a program using a procedural programming language which uses syntax and development tools of the procedural programming language having a plurality of code sections comprising a plurality of functions encoded in the procedural programming language, the functions implementing the steps of:

comparing a rule with an object and deriving a result responsive to said result and contents of said rule as specified in connection with a conditional statement in said procedural language; and determining whether attributes, relationships and a time tag of the object must be updated, and if so, performing an update, and determining whether the object must be removed from among objects of an object type to be compared with a rule, and if so, removing the object from among objects of the object type.

12. A computer implemented method as recited in claim 11, wherein responsive to said result and contents of said rule as specified in connection with a conditional statement in said procedural language, the functions further implementing the step of:

performing at least one of
- a.) applying the current rule to another object,
- b.) specifying another object to compare with a rule, and
- c.) specifying a rule to be applied to an object.

13. A computer implemented method as recited in claim 12, wherein the steps of comparing, determining, updating, removing and performing are iteratively performed until all conditional statements and results stemming from the rule have been processed for each another object and each another rule referenced with the result of the comparing step.

14. A method for generating and utilizing a declarative programming extension for a procedural programing language, comprising the steps of:

encoding a plurality of functions in a plurality of code sections of computer code using syntax and development tools of the procedural program language to form a computer program, said code representing said procedural programming language, wherein each said function is encoded in a code section; at least two functions of said plurality of functions including a rule for comparison with data objects and an operation to be performed to update a data object and specify a rule and object for a subsequent operation when said rule is satisfied; and executing said computer programming including said plurality of code sections, thereby providing an implementation suitable for use in a resource constrained system using syntax and development tools of existing said procedural programming language.

15. A method as recited in claim 14, wherein a ruleObject function of said plurality of functions is invoked when an instance of an object is created to set the time tag for the instance of the object at the current time and initializes the type attribute of the instance of the object to a base type of a given object type.

16. A method as recited in claim 14, wherein a rule function of said plurality of functions contains a unique name of a rule and a definition of the variables referring to instances of a given object type, an action corresponding to the rule and a condition statement.

17. A method as recited in claim 14, wherein a forall function of said at least two functions of said plurality of functions contains a pointer for referencing instances of an object type and an action, said function when invoked, applies a rule to an object and invokes the action if attributes or relationships of the current object satisfy a current rule.

18. A method as recited in claim 14, wherein a notforall function of said at least two functions of said plurality of functions contains a pointer for referencing instances of an object type and an action, said function when invoked, applies a rule to an object and invokes the action only if attributes or relationships of none of the objects of the object type satisfy a current rule.

19. A method as recited in claim 14, wherein a match function of said plurality of functions contains a plurality of conditions containing pointers to objects and a reference variable assignment of a rule, said function comparing attributes and relationships of objects with said rule for only those objects which have not been previously compared until all combinations of objects compared or the condition evaluates to true.

20. A method as recited in claim 14, wherein an update function of said plurality of functions alters a time tag of an object to indicate that it should be reevaluated by said match function.

21. A method as recited in claim 14, wherein a remove function of said plurality of functions removes an object from a list of objects, and wherein objects in said list of objects are of a common type.

22. A method as recited in claim 14, wherein said comparison of said rule with data objects is restricted to processing required for a rule having highest priority.

* * * * *